UNITED STATES PATENT OFFICE.

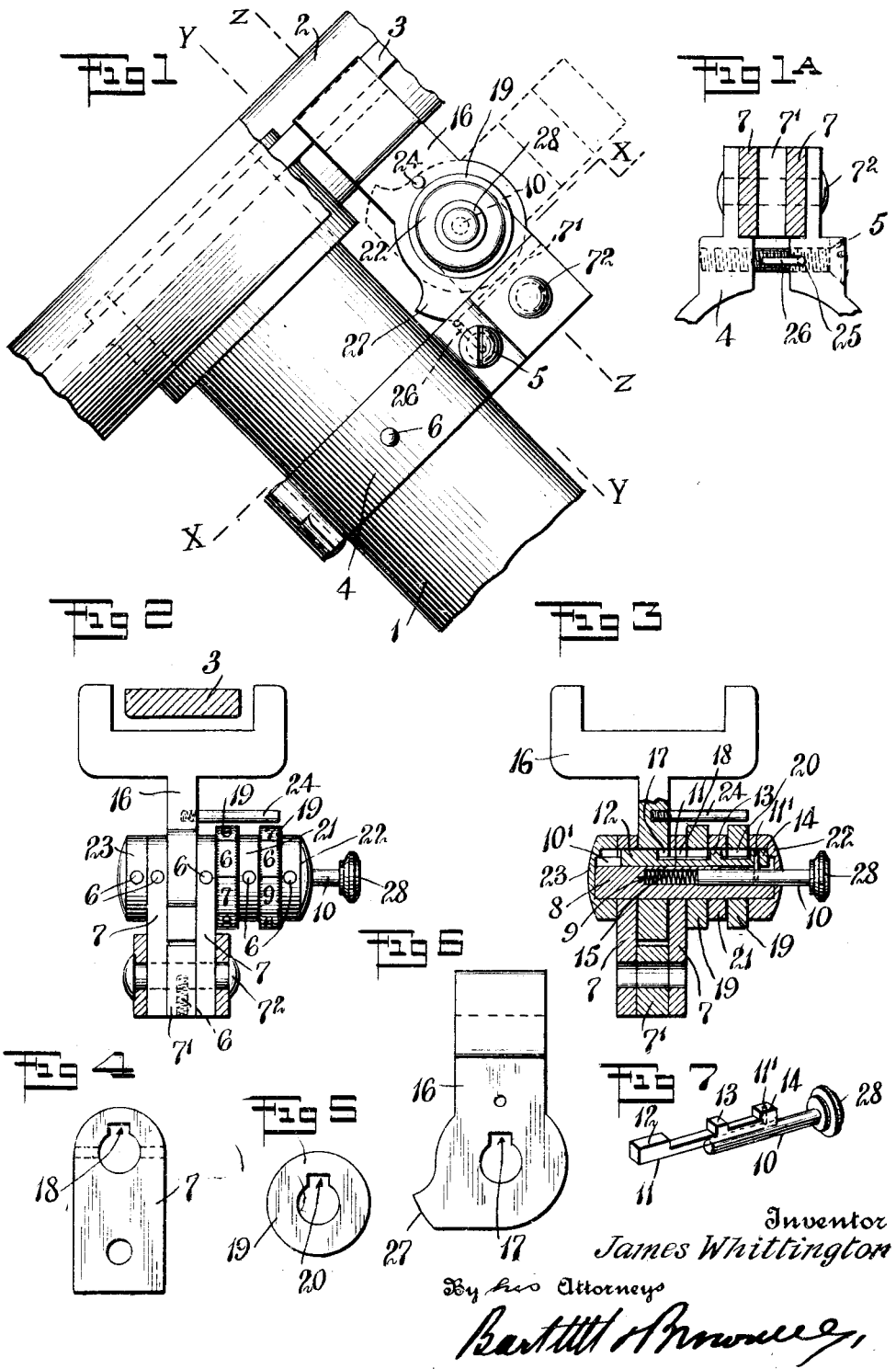

JAMES WHITTINGTON, OF PORT JERVIS, NEW YORK.

LOCK FOR STEERING-WHEELS OF AUTOMOBILES.

1,252,755.  Specification of Letters Patent.  Patented Jan. 8, 1918.

Application filed August 1, 1917. Serial No. 183,858.

*To all whom it may concern:*

Be it known that I, JAMES WHITTINGTON, a citizen of the United States, residing at Port Jervis, Orange county, New York, have invented a certain new and useful Improvement in Locks for Steering-Wheels of Automobiles, of which the following is a full, clear, and exact description.

My invention relates to locks for steering wheels of automobiles and has for its object to provide a keyless lock for holding the steering wheel of the automobile in fixed position during the absence of the owner. It further has for its object to provide a lock of this character which can be applied to any automobile.

The following is a description of an embodiment of my invention, reference being had to the accompanying drawings, in which, Figure 1 is a side elevation of a lock embodying my invention attached to the steering post of an automobile;

Fig. 1ª is a section of the lock on the line $x$—$x$, Fig. 1;

Fig. 2 is a section of the lock on the line $y$—$y$, Fig. 1;

Fig. 3 is a section on the line $z$—$z$, Fig. 1;

Fig. 4 is a detail side elevation of a supporting member;

Fig. 5 is a detail side elevation of one of the permutation rings;

Fig. 6 is a detail side elevation of the yoke member; and

Fig. 7 is a perspective view of a latching bar and actuating rod therefor.

Referring more particularly to the drawings, 1 is the steering post of an automobile carrying the ordinary shaft and steering wheel 2 having spokes 3. 4 is a clamp surrounding the steering post and held thereon by a clamping screw 5, being in addition held from movement thereon by a set-screw. This and other set-screws for holding separate parts in fixed relation are marked 6. The heads are preferably filed off to remove the slots after the set screws are inserted. The clamp 4 carries supporting members 7 separated by a spacing block 7' held in place by a pin 7² and having fixedly mounted in their outer ends a shaft 8. If the supports 7 are not integral with the members of the clamp, the pin 7² should be headed over as shown, after the screw 5 has been tightened. The shaft 8 is provided with a longitudinal bore 9 in which slides a rod 10 carrying a bar 11 which slides in a recess 10' and has projections 12, 13 and 14 which extend beyond the periphery of the shaft 8. A pin 11' connects the rod 10 and bar 11. The rod 10 projects from one end of the shaft and a spring 15 bearing against the inner end thereof tends to return it to the position shown in Fig. 3. 16 is a yoke member having on its free end a U-shaped yoke adapted to partially embrace one of the spokes 3. This yoke member is rotatably mounted upon the shaft 8 and, adjacent to that shaft, is provided with a recess 17 (Fig. 6) for receiving the projection 12. The left-hand member of the support is provided with a recess 18 in line with the projection 12 and adapted to contain a portion of the same extending beyond the recess 17. When the projection 12 is out of the recess 17 and entirely within the recess 18, the yoke is free to be turned into the position shown in dotted lines (Fig. 1) so as to free the spoke 3. The spring 15 moves the projection 12 into the recess 17 when the recess 17 is in line with the projection 12, that being the condition when the yoke is moved to the position shown in full lines so as to embrace the spoke 3. In order to lock the rod 10 with the projections 12, 13 and 14 in yoke-locking position, I provide a plurality of permutation rings 19, each one of which bears upon its periphery a plurality of numbers whereby the rings may be positioned. The axes of these rings are in alinement with the axis of shaft 8. Each of these rings is provided adjacent to the shaft 8 with a recess 20 adapted to be alined with one of the projections 13 and 14 and when these recesses 20 are alined with those projections, the projections 12, 13 and 14 are free to be moved laterally to permit the withdrawal of the projection 12 from its recess 17 in the yoke so as to unlock the yoke. When, however, the yoke is locked and both or either of the rings 19 are turned so that their recesses 20 are not in line with the projections 13 and 14, the rod 10, together with the projections 12, 13 and 14, are held against movement, so that the yoke can not be unlocked.

The rings 19 are separated by a ring 21 fixed upon the shaft 8, which ring is provided with a recess similar to the recess 20 but always in line with the projection 13 for receiving it when the yoke is locked. A cap 22 is provided at the right-hand end of the shaft 8, being fixed in position thereon and having a recess adapted to receive the projection 14 when the yoke is in locked position. The other end of the shaft is provided with a cap 23 which is fixedly secured thereon and has a recess for receiving the left-hand end of the bar 11 and projection 12.

The yoke is provided with an index 24 which serves as a convenient means to assist in positioning the rings 19 in rod-unlocking position.

In order to prevent the screw 5 from being turned so as to loosen the clamp 4, I form a recess 25 in the inner wall of the support for a pin 26 which passes into the screw 5, and upon the yoke member form an extension 27, which lies above this pin when the yoke member is in locked position, therefore preventing access to the pin 26 for the removal thereof. The rod 10 is preferably provided with a head or push-button 28.

I preferably use as index marks series of letters or numbers in which the same marks are repeated in different orders or on the two wheels, so that one glancing at the device when the yoke is unlocked will be liable to be misled as to the permutation necessary for unlocking the yoke. Thus, when the unlocking permutation is such that the numbers 9—6 on the left-hand ring are in line with the numbers 6—7 on the right-hand ring and properly positioned with relation to the index 24, I make the numbers on the left-hand ring as follows— 9—6—7—8—9—8—7—6 and on the right-hand ring 7—6—9—6—7—8—9—8. In the device as shown, the lock is unlocked when the numbers 9 and 6, and 7 and 6 are visible just in front of the index 24, i. e., when the index 24 lies between the numbers 6 and 9 of the series 7—6—9 on the left-hand ring and 8 and 7 of the series 9—8—7 on the right-hand ring.

In using this lock it is applied in the manner shown. When the yoke member is in the position shown in dotted lines, the wheel 2 can be turned. When it is desired to lock the machine, the yoke member is turned into the position shown in full lines and one or both of the rings 19 moved, whereupon the wheel 2 is locked without the aid of a key. When it is desired to unlock the wheel 2, the rings 19 are properly positioned and the button 28 pressed, whereupon the yoke 10 is released and can be turned into the position shown in dotted lines, so as to permit the wheel to be turned.

As will be evident to those skilled in the art, my invention permits of various modifications without departing from the spirit thereof or the scope of the appended claims.

What I claim is:

1. In a lock for automobiles, the combination of a support carried by the steering post adjacent to the steering wheel, a yoke pivotally mounted in said support and adapted to be moved into and out of engagement with a spoke of said steering wheel, and a permutation lock carried directly by said support and adapted to engage said yoke for locking said yoke when turned about its pivot so as to be in engagement with said spoke, said permutation lock having its axis in alinement with the axis of rotation of said yoke.

2. In a lock for automobiles, the combination of a support, a shaft carried thereby, a yoke pivotally mounted thereon, a rod extending into the end of said shaft and carrying a plurality of projections extending beyond the periphery of said shaft, said yoke having a projection receiving recess in line with one of said projections when said yoke is in one of its positions, a locking ring surrounding the axis of said shaft and rod and having a recess for another of said projections and containing the same when said first projection is not in the recess in said yoke, and a spring tending to hold said rod in yoke-locking position.

3. In a lock for automobiles, the combination of a support, a shaft carried thereby, an arm rotatably mounted thereon, a rod extending into one end of said shaft and carrying a plurality of projections extending beyond the periphery of said shaft, said arm having a projection receiving recess in line with one of said projections when said arm is in one of its positions, a plurality of revolving rings surrounding the axis of said pivot and rod, each having a recess for other of said projections and containing the same when said first projection is not in the recess in said arm, and a spring tending to hold said rod in arm-locking position.

4. In a lock for automobiles, the combination of a support carried by the steering post adjacent to the steering wheel, a yoke pivotally mounted in said support and adapted to be moved into and out of engagement with a spoke of said steering wheel, a permutation lock for locking said yoke when in engagement with said spoke, a clamp for securing said support to the steering post, a screw for holding said clamp, a lock pin for said screw, and a projection on said yoke extending over the head of said lock pin when said yoke is in wheel-locking position.

5. In a lock for automobiles, the combination of a support, a shaft carried thereby, a yoke rotatably mounted thereon, a rod extending into said shaft and carrying a plurality of projections extending beyond the periphery of said shaft, said yoke having a projection receiving recess in line with one of said projections when said yoke is in one of its positions, a locking ring surrounding the axis of said shaft and rod and having a recess for receiving another of said projections when said first named projection is not in its recess, a spring tending to hold said rod in yoke-locking position, an indicating mark on said ring and an index on said yoke and movable therewith for locating said ring by said mark in rod-unlocking position.

6. In an automobile lock, the combination of a support, a shaft mounted therein, a yoke member revolubly mounted thereon, a rod extending from one end of said shaft and carrying a projection extending beyond the periphery of said shaft, said yoke having a recess adjacent to said shaft for receiving said projection and a spring normally tending to force said projection toward said yoke member when moved away therefrom, and a lock for holding said projection in said recess.

7. In an automobile lock, the combination of a support, a shaft mounted therein, a yoke member revolubly mounted thereon, a rod extending from one end of said shaft and carrying a projection extending beyond the periphery of said shaft, said yoke having a recess adjacent to said shaft for receiving said projection, a spring normally tending to force said projection toward said yoke member when moved away therefrom, and detaining means adapted to be set so as to hold said projection from movement away from said yoke member.

JAMES WHITTINGTON.

Copies of this patent may be obtained for five cents each, by addressing the "Commissioner of Patents, Washington, D. C."